United States Patent [19]

Kaster et al.

[11] Patent Number: 5,529,455
[45] Date of Patent: Jun. 25, 1996

[54] SEED DRILL FEED AUGER MOUNTING ASSEMBLY

[75] Inventors: P. Philip Kaster, Shelbyville; Timothy Netherly, Rushville, both of Ind.

[73] Assignee: Kasco Mfg. Co., Inc., Shelbyville, Ind.

[21] Appl. No.: 331,976

[22] Filed: Oct. 31, 1994

[51] Int. Cl.⁶ .................................................. B60P 1/42
[52] U.S. Cl. ........................ 414/523; 198/317; 198/589; 198/861.4; 414/345; 414/526
[58] Field of Search ................................ 414/345, 523, 414/526; 198/317, 559, 861.4

[56] References Cited

U.S. PATENT DOCUMENTS

| | | | |
|---|---|---|---|
| 1,735,920 | 11/1929 | Fitzhugh | 198/861.4 |
| 3,307,679 | 3/1967 | Ziegler et al. | 198/861.4 |
| 3,767,031 | 10/1973 | Gorgei et al. | 198/861.4 |
| 3,863,783 | 2/1975 | Spellman, Jr. | 414/523 |
| 3,904,024 | 9/1975 | Smith | 198/861.4 X |
| 4,082,181 | 4/1978 | Berthold et al. | 198/861.4 |
| 4,119,223 | 10/1978 | Fiechter | 414/523 |
| 4,312,621 | 1/1982 | Quanbeck et al. | 414/523 |

OTHER PUBLICATIONS

Kasco Mfg. Co., Inc., "Kasco Single Auger System for Grain Drills", Shelbyville, Indiana.

*Primary Examiner*—David A. Bucci
*Attorney, Agent, or Firm*—Barnes & Thornburg

[57] ABSTRACT

A mounting assembly is provided for a device for transporting seed from a hopper, upwardly along a conveyor, to a transversely extending seed trough. The mounting assembly includes a stand fixed relative to the seed trough and an elongated frame. The elongated frame includes a top, a bottom, and two sides. The bottom is pivotally mounted to the stand. A carriage is movably coupled to the frame and is arranged to traverse the length of the frame. The mounting assembly also includes a coupling having a base and a union. The base is rotatably mounted to the carriage and the union is pivotally mounted to the conveyor.

38 Claims, 4 Drawing Sheets

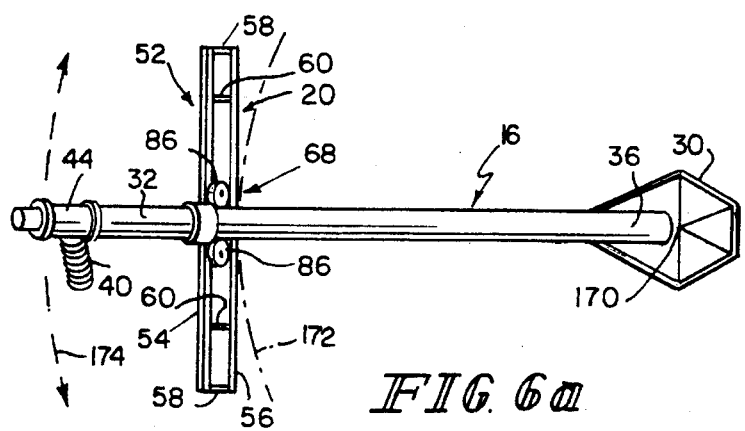 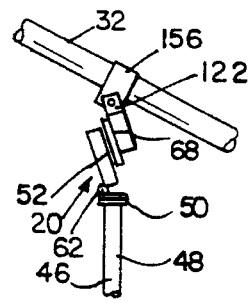
FIG. 6a  FIG. 6b
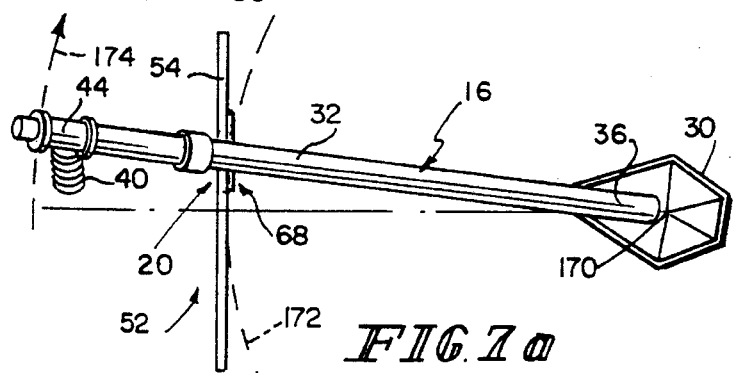 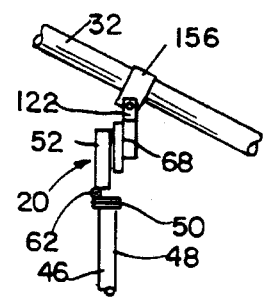
FIG. 7a  FIG. 7b
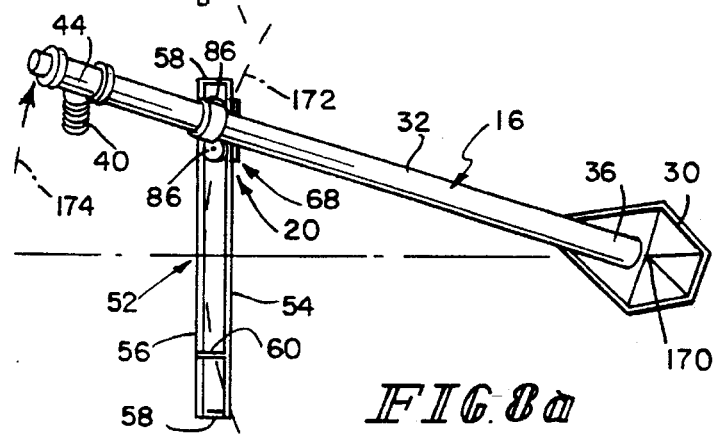 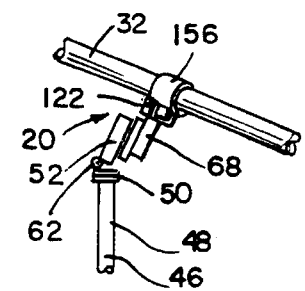
FIG. 8a  FIG. 8b
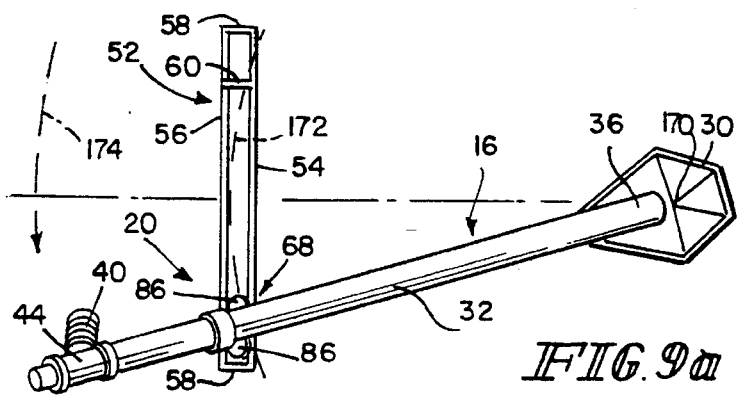 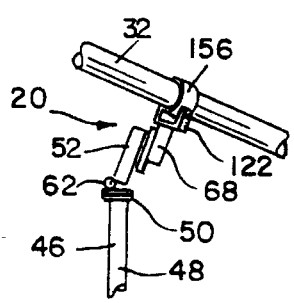
FIG. 9a  FIG. 9b

SEED DRILL FEED AUGER MOUNTING ASSEMBLY

BACKGROUND AND SUMMARY OF THE INVENTION

The present invention relates to an apparatus for conveying seed from a mobile storage bin to a seed planting device, and particularly to a mounting assembly for a seed drill feed auger. More particularly, the present invention relates to a mounting assembly that is mounted to a seed drill having a plurality of spaced-apart seed drills positioned beneath a transverse seed trough, the mounting assembly supporting a seed conveyor that includes a hopper for receiving seed from a mobile storage bin. The conveyor is arranged to deliver seed upwardly from the hopper to the seed trough.

In farming today, it is common to deliver seed, e.g. soybeans, to the field in large mobile storage bins. This is more convenient and less expensive than the prior practice of delivering the seed in individual bags. The large mobile bins are conventionally constructed with a bottom side gravity feed chute which will drop the seed into a lower end hopper of an auger-type elevator.

Recently, auger-type conveyors have been provided to mount on the seed drills. When it is time to reload the drill, the conveyor hoppers are lowered to the ground beneath the gravity feed chute of the mobile bin. However, when the hopper engages the ground under the feed chute, it defines a fixed point for the auger conveyor to pivot as the upper end of the conveyor is moved above and along the trough of the feed drill to drop the seed into the trough. These present auger-conveyors are mounted on the drills in such a manner that, when the conveyors pivot about the hoppers, the upper end of the conveyor moves through an arc that is not directly above the trough.

According to the present invention, a mounting assembly is provided for a device for transporting seed from a hopper upwardly along an auger to a point above a transversely extending seed trough. The mounting assembly includes a stand fixed relative to the seed trough and a frame including a top, a bottom, and two sides, the bottom of which is pivotally mounted to the stand. A carriage is movably coupled to the frame and is arranged to traverse the length of the frame. A coupling having a base that is rotatably mounted to the carriage and a union that is pivotally mounted to the auger is included to provide the auger with freedom of movement in any direction about the coupling with respect to the mounting assembly. While an auger is described herein, particularly an auger of the type having a rotating shaft with a helical flange carried on the shaft, it will be appreciated that any conventional type of conveyor may be utilized to convey the seeds upwardly from the hopper to a point above the trough.

The carriage includes a bar and a roller rotatably mounted on the bar as well as a mount fixed to the bar and sized to accept the base of the coupling. The roller is rollably mounted on the frame so that the carriage traverses the length of the frame. The carriage further includes a stabilizing roller that is arranged to prevent movement of the carriage in a direction perpendicular to the frame as the top of the frame pivots toward and away from the seed trough.

The freedom of movement of the shaft about the coupling and the complex motion of the coupling achieved through the combined lateral movement of the carriage and pivoting movement of the frame on which the carriage rides permits a pivot point on the hopper to remain stationary while the second end of the shaft moves laterally along an arced path above the seed trough. This movement allows the hopper to collect seed from a bulk storage source near the seed trough while simultaneously allowing the upper end of the seed conveyor to sweep above and along the laterally extending seed trough.

The ability to keep the pivot point on the hopper stationary relative to the bulk storage source allows an operator to load the trough its full length without having to reposition the hopper and the mobile storage bin relative to the drill. The sweeping motion simultaneously achieved by the upper end of the seed conveyor allows an operator to maintain an even distribution of seed to the trough. Farmers will appreciate the simplicity of the mounting assembly for its reliability and ease of maintenance while also appreciating the time savings accomplished by not having to reposition the hopper and mobile storage bin.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 6a is a view similar to FIG. 2 showing the chute dispersing seed into the middle of the trough with the conveyor generally perpendicular to the trough, the carriage generally in the middle of the frame, and the frame pivoted backward with the top of the frame pivoted toward the trough;

FIG. 6b is a view similar to FIG. 3 showing the chute dispersing seed into the middle of the trough with the frame pivoted backward having the top of the frame pivoted toward the trough;

FIG. 7a is a view similar to FIG. 6a showing the chute dispersing seed toward one side of the trough with the conveyor moved partially toward the side of the trough, the carriage moved partially toward the side of the frame, and the frame standing essentially vertically;

FIG. 7b is a view similar to FIG. 6b showing the chute dispersing seed toward one side of the trough with the frame standing essentially vertically;

FIG. 8a is a view similar to FIG. 7a showing the chute dispersing seed on one side of the trough with the conveyor moved to that side of the trough, the carriage moved to that side of the frame, and the frame pivoted forward with the top of the frame pivoted away from the trough;

FIG. 8b is a view similar to FIG. 7b showing the chute dispersing seed on one side of the trough with the frame pivoted forward having the top of the frame pivoted away from the trough;

FIG. 9a is a view similar to FIG. 8a showing the chute dispersing seed to the side of the trough opposite the side shown in FIG. 8a with the conveyor moved to that side of the trough, the carriage moved to that side of the frame, and the frame pivoted forward with the top of the frame pivoted away from the trough; and FIG. 9b is a view similar to FIG. 8b showing the chute dispersing seed to the side of the trough opposite the side shown in FIG. 8b with the frame pivoted forward having the top of the frame pivoted away from the trough.

DETAILED DESCRIPTION OF THE DRAWINGS

Figure 1:
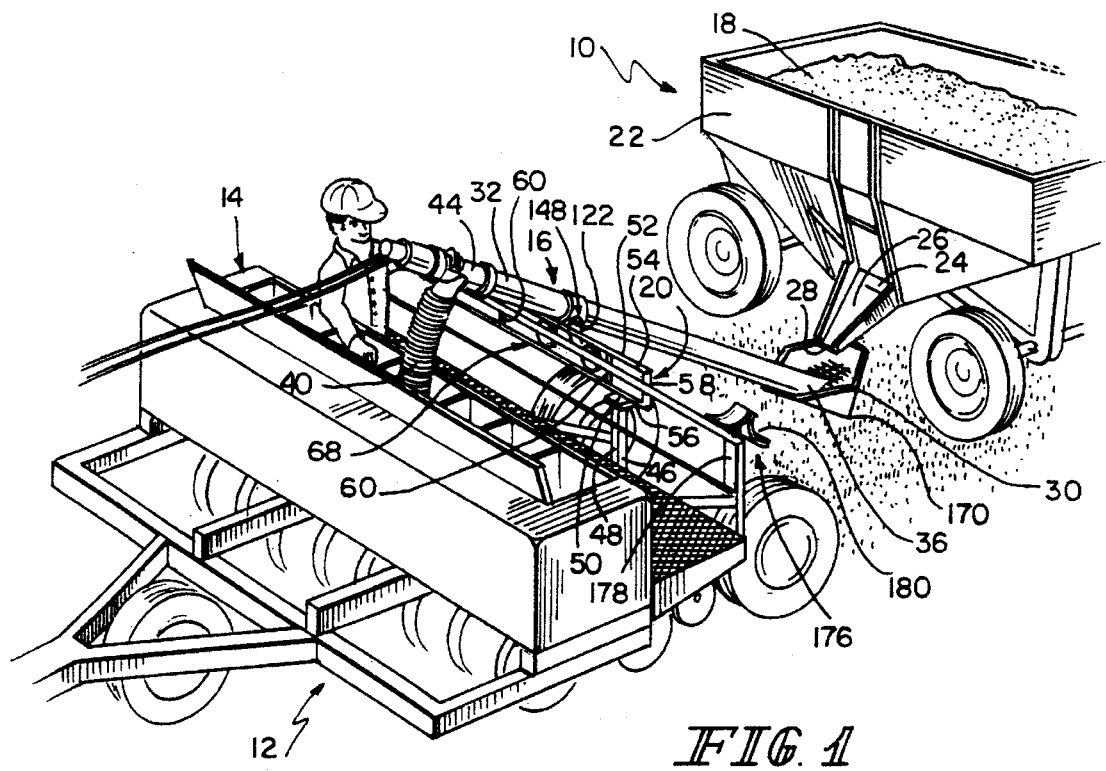
FIG. 1 is a perspective view of a mobile seed storage bin and a drill including a laterally extending seed trough, an elongated cylindrical seed conveyor for accepting seed from the seed storage bin and transporting seed upwardly, a chute mounted to the top of the conveyor for dispersing the seed into the trough, and a mounting assembly in accordance with the present invention including a frame supported on a stand and a carriage coupled to the conveyor and mounted to the frame.

A mobile seed storage bin 10 and a drill 12 including a plurality of spaced-apart seed drills (not shown) are illustrated in FIG. 1. The drill 12 carries a laterally extending seed trough 14 positioned above the seed drills, a conveyor 16 for accepting seed 18 from the bin 10 and transporting the seed 18 upwardly, and a mounting assembly 20 supporting the conveyor 16 on the drill 12. The bin 10 conventionally includes a container 22 with an opening 24 and a storage bin chute 26. Seed 18 to be planted is loaded into the container 22 and expelled as needed through the opening 24. The seed 18 travels through the opening 24 to the chute 26 which is inclined to ensure that the seed 18 traverses the chute 26 until it falls from the edge 28 of the chute 26.

Figure 3:
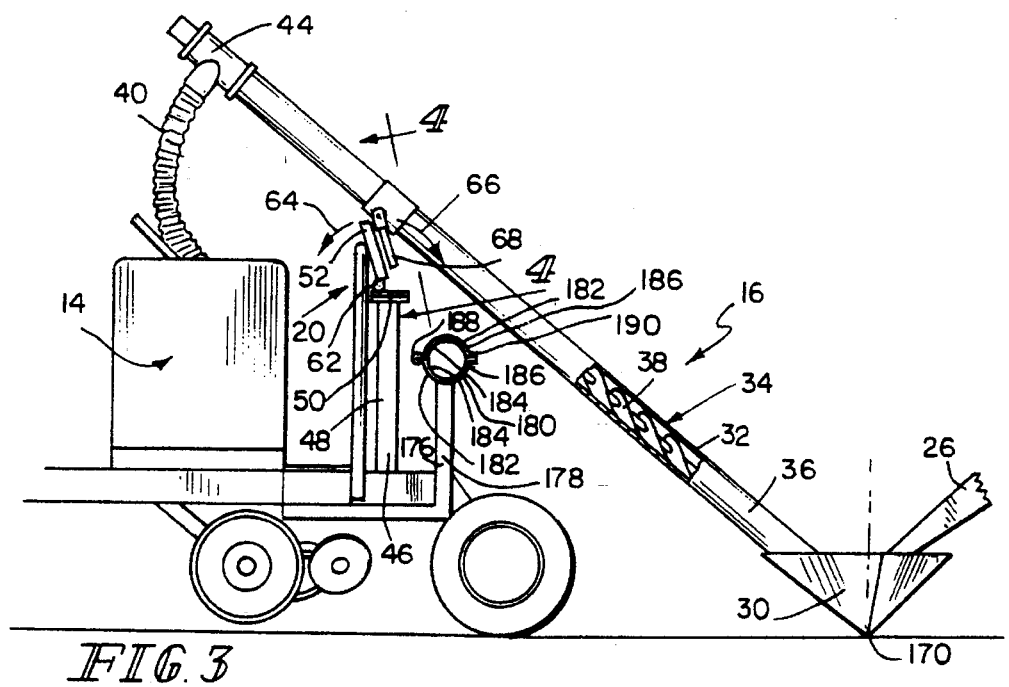
FIG. 3 is an elevation view of the drill of FIG. 2 showing the conveyor with part of the conveyor wall cut away to reveal a conventional auger shaft, showing the chute extending downwardly from the top of the conveyor and into the trough, and showing the mounting assembly fixed to a stand and pivoting to maintain the position of the seed-receiving end of the conveyor.

A hopper 30 is attached to the conveyor 16 and is manually positioned by an operator to catch the seed 18 as it falls from the edge 28 of the storage bin chute 26. The conveyor 16 will typically be an auger assembly including an elongated cylindrical wall 32 defining a hollow interior 34. The hopper 30 is appended to the seed-receiving end 36 of the wall 32, an auger 38 is positioned inside of the interior 34 as shown best in FIG. 3, and a chute 40 is attached to the top 44 of the wall 32. The wall 32 is formed to include an opening adjacent to the chute 40 so that the chute 40 is in fluid communication with the interior 34. The seed-receiving end 36 of the auger 38 is positioned to lie within the hopper 30. Rotation of the auger 38 acts to transport seed 18 from the hopper 30 to the chute 40.

Figure 2:
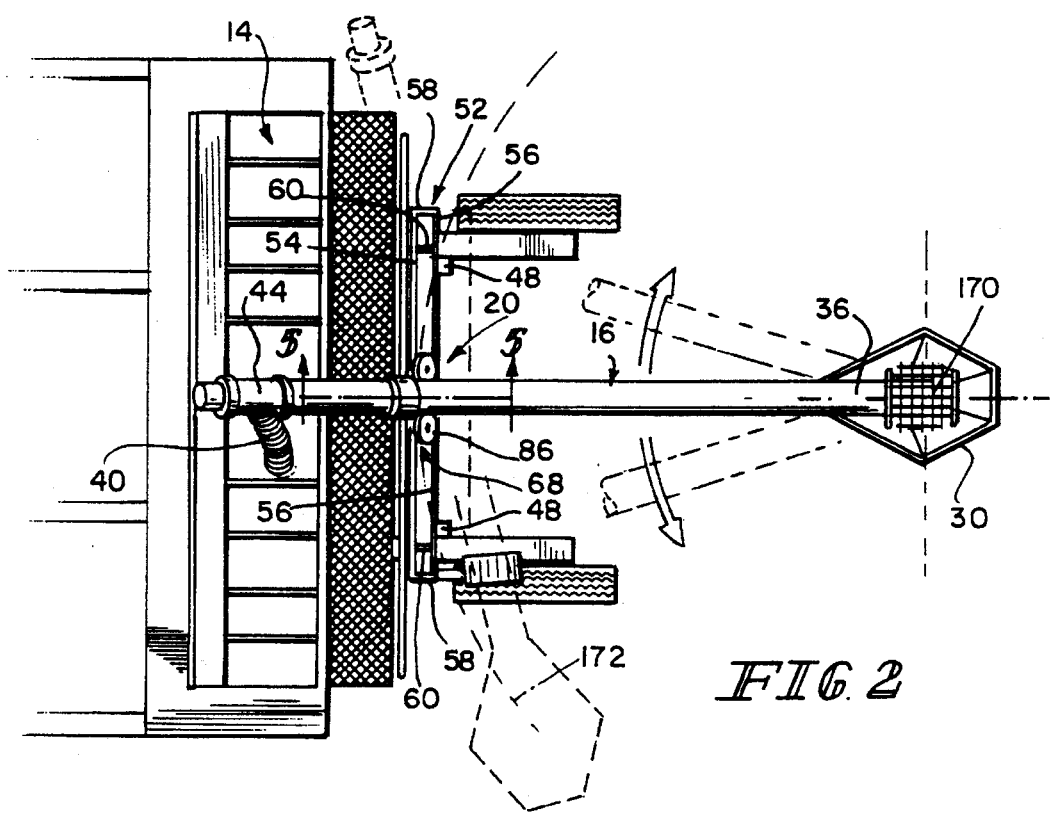
FIG. 2 is a plan view of the drill of FIG. 1 showing the elongated auger-type conveyor with the chute positioned to disperse seed into the middle of the seed trough, demonstrating the pivoting action of the auger about a point at the seed-receiving end (in phantom), and showing the conveyor in a stored position (in phantom)

Seed 18 from the chute 40 is dispensed into the seed trough 14 positioned above the spaced-apart seed drills (not shown) that plant the seed 18. Seed 18 from the trough 14 is gravity-fed to the seed drills. To maintain a constant supply of seed 18 to each of the seed drills, the operator must maneuver the chute 40 laterally above the trough 14 to dispense seed 18 evenly along the trough 14. A mounting assembly 20 in accordance with the present invention accommodates the pivotal movement of the chute 40 while maintaining the stationary position of the hopper 30 as best shown in FIG. 2.

The mounting assembly 20 is attached to a stand 46 that is fixed to the drill 12 thereby fixing the stand 46 relative to the trough 14. The stand 46 is positioned to lie on the side of the drill 12 trailing the trough 14 so that access to the conveyor 16 is achieved from the rear of the drill 12. The illustrative stand 46 includes two posts 48 that extend upwardly from the drill 12, the posts 48 terminating in rectangular mounting platforms 50. It will be understood that any other suitable stand 46 can also be used.

The mounting assembly 20 includes a frame 52 having an elongated top 54, an elongated bottom 56, sides 58 fixed to the top 54 and the bottom 56, and support struts 60 fixed to the top 54 and the bottom 56 to structurally strengthen the frame 52. The bottom 56 of the frame 52 is pivotally mounted to the mounting platforms 50 by hinges 62. The hinges 62 are arranged to permit the top 54 of the frame 52 to pivot both backward 64 toward the trough 14 and forward 66 away from the trough 14 as shown best in FIGS. 3 and 5. The hinges 62 are conventional units and are well known by those skilled in the art. It will be understood that any suitable hinges 62 can be used as means for pivotally mounting the frame 52.

Figure 4:
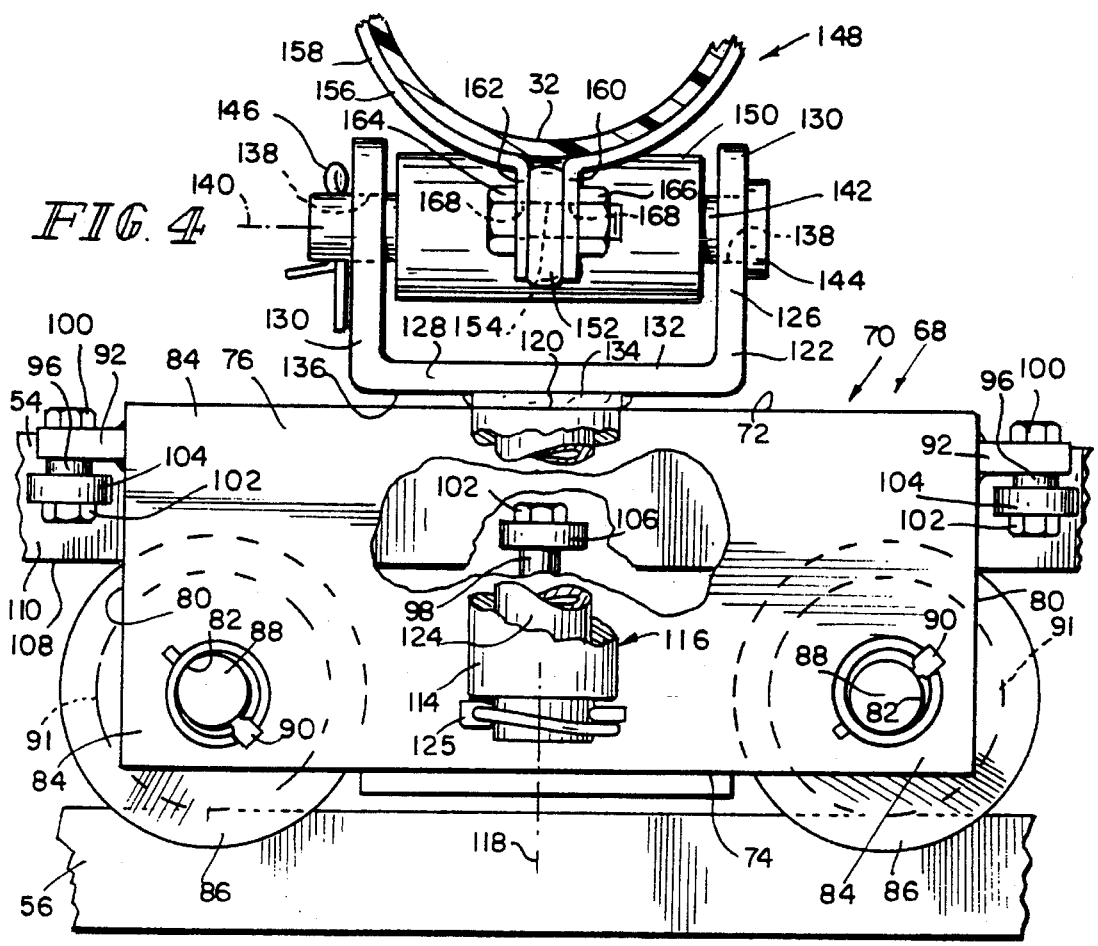
FIG. 4 is a sectional view taken along line 4—4 of FIG. 3 showing the rectangular carriage, two rollers rotatably mounted to the carriage and arranged to engage the frame, and a Y-shaped union coupling the carriage to the wall of the conveyor.
Figure 5:
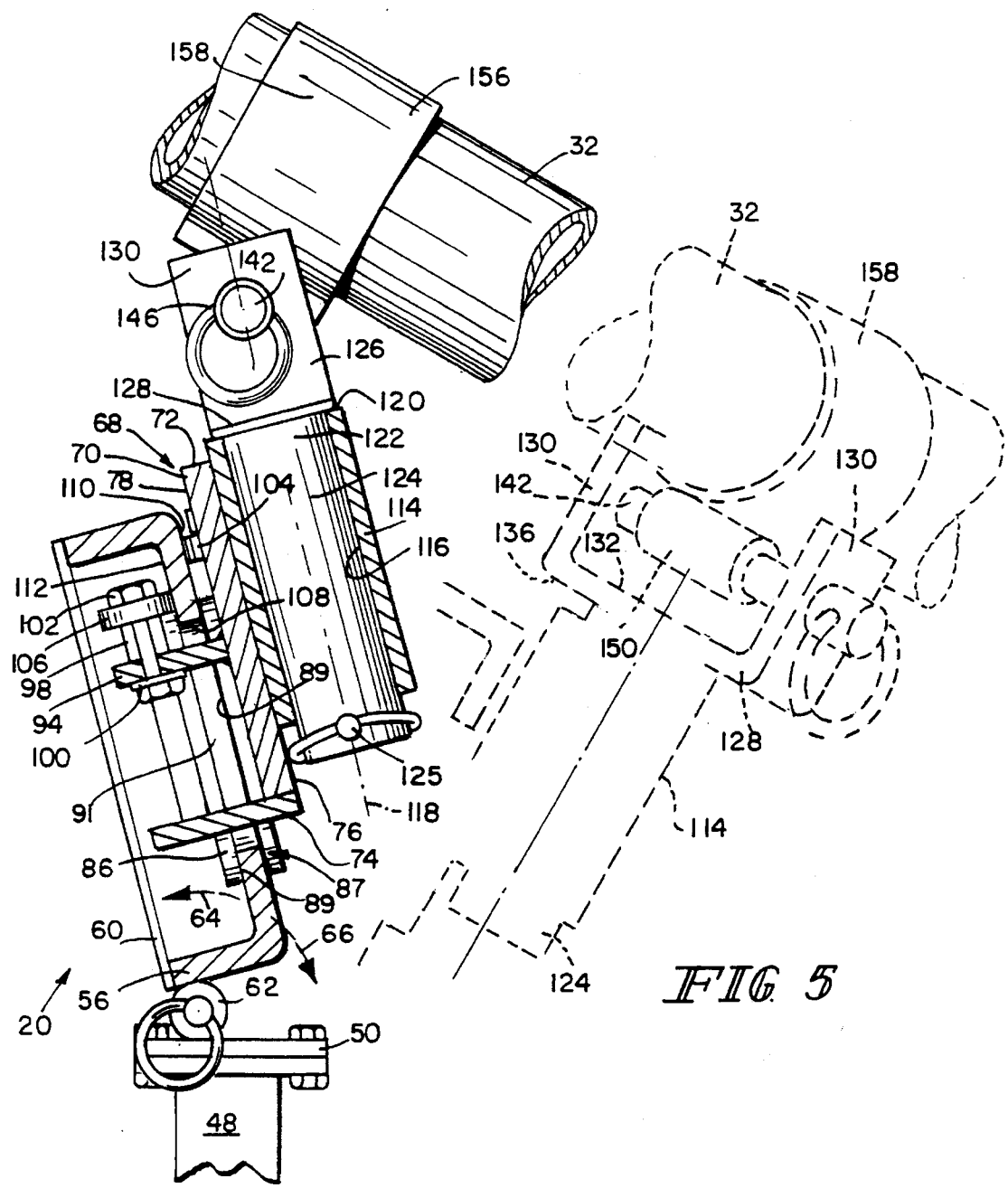
FIG. 5 is a sectional view taken along line 5—5 of FIG. 2 showing the rectangular frame mounted to the stand and pivoting backwards, the carriage mounted to the front of the frame, and a portion of the cylindrical conveyor wall pivotally coupled to a union that is mounted to the carriage, and showing (in phantom) the relative changes in position of the conveyor wall, the union and the carriage as the frame pivots forward in response to movement of the chute above the seed trough.

The illustrative mounting assembly 20 also includes a carriage 68 having a flat rectangular bar 70 formed to include a top 72, a bottom 74, a first face 76, an opposing second face 78, and two sides 80 as best shown in FIGS. 4 and 5. The bar 70 is formed to include two roller-receiving openings 82 arranged to penetrate the first and second faces 76, 78 and positioned to lie near the corners 84 adjacent the bottom 74 of the bar 70.

The carriage 68 also carries two rollers 86 rotatably mounted to the bar 70. The rollers 86 are formed to include circumferential channels 87 having channel side walls 89 and a channel bottom 91, as best shown in FIG. 5. Each roller 86 is rotatably coupled to an axle 88 sized to be received by one of the openings 82. The axles 88 penetrate the openings 82 and are held in the roller-receiving openings 82 by pins 90 that pierce the axles 88. The rollers 86 are sized to engage the top 54 and the bottom 56 of the frame 52 so that the rollers 86 can travel the length of the frame 52 between the two sides 58.

The carriage 68 further includes two forward post-support platforms 92 and one rear post-support platform 94. The platforms 92, 94 are appended to the bar 70 and are arranged so that a portion of the platforms 92, 94 extend outwardly from the second face 78. The forward post-support platforms 92 are positioned to lie near the corners 84 adjacent the top 72 of the bar 70 and the rear post-support platform 94 is positioned to lie near the bottom 74 of the bar 70. The platforms 92, 94 are configured to carry posts 96, 98 that are arranged to extend in a direction parallel to the sides 80. Each post is formed to include a first end 100 appended to the platform 92, 94 and a second end 102. The forward posts 96 extend downwardly from the platforms 92 and terminate at the second end 102 and the rear post 98 extends upwardly from the platform 94 and terminates at the second end 102.

Stabilizing rollers 104, 106 are rotatably mounted to the second ends 102 of the posts 96, 98. The stabilizing rollers 104, 106 are arranged to engage the top 54 of the frame 52 when the carriage 68 is mounted to the frame 52 with the rollers 86 engaging the bottom 56 and the top 54 of the frame 52. The top 54 of the frame 52 is formed to include a bottom edge 108, a first face 110, and a second face 112. When the carriage 68 is mounted to the frame 52, the rollers 86 engage the bottom edge 108. The forward stabilizing rollers 104 are arranged to engage the first face 110 of the top 54 of the frame 52 and the rear stabilizing roller 106 is arranged to engage the second face 112 of the top 54 of the frame 52.

When the frame 52 pivots so that the top 54 moves backward 64 toward the trough 14, the forward stabilizing rollers 104 rest upon the first face 110 of the top 54 of the frame 52 and cooperate with the channel side walls 89 of the rollers 86 that are in engagement with the bottom edge 108 of the top 54 and with the bottom 56 of the frame 52 to prevent the carriage 68 from demounting from the frame 52. When the frame 52 pivots so that the top 54 moves forward 66 away from the trough 14, the rear stabilizing roller 106 rest upon the second face 112 of the top 54 of the frame 52 and cooperates with the channel side walls 89 of the rollers 86 that are in engagement with the bottom edge 108 of the top 54 and with the bottom 56 of the frame 52 to prevent the carriage 68 from demounting from the frame 52. Thus, the stabilizing rollers 104, 106 act along with the rollers 86 to prevent movement of the carriage 68 perpendicular to the frame 52.

A mount 114 formed to include an open-ended cylindrical cavity 116 is fixed to the bar 70. The mount is appended to the first face 76 of the bar 70 with the central axis 118 of the cylindrical cavity 116 extending in a direction parallel to the sides 80 of the bar 70. The top edge 120 of the mount 114 is positioned to lie generally adjacent to the top 72 of the bar 70.

A Y-shaped coupling 122 couples the conveyor 16 to the carriage 68. The coupling 122 is arranged to provide universal movement of the conveyor 16 to any position relative to the carriage 68 about the coupling 122. The coupling 122 includes a base 124 and a U-shaped bracket 126 appended to the base, the bracket 126 including a platform 128 and two parallel spaced-apart prongs 130 extending upwardly from the top 132 of the platform 128.

The base 124 is cylindrical and is sized to be loosely received by the cavity 116 of the mount 114. The base 124 is secured in the mount 114 by a pin 125 arranged to penetrate the portion of the base exposed beneath the mount 114. To achieve universal movement of the conveyor about the coupling 122, the base 124 and the mount 114 cooperate to permit rotation of the base 124 in the cavity 116. The base 124 further includes a top 134 that is fixed to the bottom 136 of the platform 128 of the bracket 126. The coupling 122 is arranged so that the base 124 extends downwardly from the platform 128 and the two prongs 130 extend upwardly from the platform 128, the two prongs 130 and the base 124 each extending in parallel directions.

The prongs 130 are each formed to include an opening 138. The openings 138 of the prongs 130 penetrate the width of the prongs 130 and both openings 138 are positioned to lie on a single axis 140 that is parallel to the platform 128. The openings 138 are sized to receive an axle 142 of a length sufficient to span the distance between the two prongs 130. The axle 142 is rotatably received by the openings 138 and is secured to the prongs 130 by a head 144 that is integrally appended to the axle 142. The head 144 is sized to be larger than the openings 138 and is positioned to lie outside of one of the prongs 138. The axle 142 is also secured by a pin 146 that penetrates the axle 142 on the outside of the prong 138 opposite the prong 138 carrying the head 144.

A conveyor-attaching assembly 148 for attaching the conveyor 16 to the coupling 122 includes the axle 142 surrounded by a bushing 150 with two tabs 152 fixed to the bushing 150 and the axle 142. The tabs 152 are formed to include apertures 154. A bracket 156 having a C-shaped strap 158 with tabs 160 appended to one end of the strap 158 and opposing tabs 162 appended to the second end of the strap 158 attaches the conveyor 16 to the axle 142. The opposing tabs 160, 162 are fastened by threaded fastening devices 164 and threaded holders 166 sized to restrain the threaded fastening devices 164.

The strap 158 is sized to fit around the circumference of the wall 32 of the conveyor 16. The bracket tabs 160, 162 are appended to the terminal ends of the strap 158 and extend outwardly from the strap 158. The tabs 152, 160, 162 are formed to include apertures 154, 168 sized to accept the threaded fastening devices 164. Though threaded fastening devices 164 and threaded holders 166 are used to fasten the tabs and thereby secure the bracket 156 to the coupling 122, it will be obvious to one skilled in the art that any suitable devices for fastening the tabs 160, 162 including but not limited to rivets, pins and clamps can be used.

To secure the conveyor 16 to the coupling 122, the bracket 156 is arranged with the C-shaped strap 158 surrounding the wall 32. The apertures 168 in the bracket tabs 160, 162 are aligned with the apertures 154 in the axle tabs 152. The tabs 152, 160, 162 are arranged with the axle tabs 152 being interleaved between the tabs 160 appended to one end of the strap 158 and the tabs 162 appended to the other end of the strap 158. The threaded fastening device 164 is received by the apertures 154, 168 and the threaded holder 166 is attached to the threaded fastening device 164, thus securing the bracket 156 to the conveyor 16 and the conveyor 16 to the axle 142 of coupling 122.

Rotating movement of the axle 142 results in a pivoting movement of the conveyor 16 about the coupling 122. The conveyor 16 will pivot relative to the coupling 122 about the axis 140 provided by the axle 142. The conveyor 16 will also rotate with respect to the carriage 68 about the axis 118 provided by the mount 114 and the base 124 of the coupling 122. As the conveyor 16 rotates, the bracket 154 will transfer the rotational movement of the conveyor 16 to the prongs 130 of the coupling 122. The prongs 130 will in turn transfer the movement to the base 124 of the coupling 122 which will rotate within the cavity 116 of the mount 114.

Thus, the conveyor 16 will be coupled to the mounting assembly 20 and will be provided with freedom of movement in any direction about the coupling 122 relative to the mounting assembly 122. This freedom of movement about the coupling 122 cooperates with the pivoting movement of the frame 52 and the translational movement of the carriage 68 to attach the conveyor 16 to the drill 12 with the chute 40 free to move laterally above seed trough 14 while a pivot point 170 in the hopper 30 remains stationary relative to the seed trough 14.

When planting seed 18 in a field, the drill 12 is pulled across the field by a vehicle (not shown) and the spaced-apart seed drills (not shown) accept seed 18 from the seed trough 14 and plant the seed 18 in spaced-apart rows. The seed-drills are gravity-fed from the seed tough 14 so it is important that an adequate supply of seed 18 be maintained in the seed trough 14 at all times.

A mobile storage bin 10 containing seed 18 is moved along one end of the field at which the rows terminate. After several rows are planted and the hopper 14 is emptied, the drill 12 is stopped at the end of the field adjacent the bin 10. As shown best in FIG. 1, the operator positions the hopper 30 to collect the seed 18 from the bin 10. The conveyor 16 lifts the seed 18 from the hopper 30 to the chute 40 appended to the top 44 of the conveyor 16. The operator, while maintaining the stationary position of the pivot point 170 in the hopper 30 relative to the seed trough 14, dispenses the seed 18 from the chute 40 evenly along the trough 14 by moving the chute 40, and thus the top 44 of the conveyor 16, laterally back and forth over the seed trough 14.

The mounting assembly 20 of the present invention supports the conveyor 16 during movement of the chute 40 along and above the trough 14 such that the pivot point 170 of the hopper 30 remains stationary relative to the seed trough 14, as shown best in FIG. 2. The mounting assembly 20 is capable of movably mounting the conveyor 16 so that the pivot point 170 remains stationary and the coupling 122 between the conveyor 16 and the mounting assembly 20 travels an arced path 172 parallel to the arced path 174 travelled by the top 44 of the conveyor 16 during movement of the chute 40 above the trough 14 as best shown in FIGS. 6–9.

The arcing motion of the coupling 122 is achieved by combining the lateral movement of the carriage 68 along the frame 52 and the pivoting movement of the frame 52, as best shown in FIGS. 5 and 6–9. When the chute 40 and the conveyor 16 are positioned to dispense seed 18 into the middle of the trough 14 as shown in FIG. 6, the frame 52 is pointed backward 64 with the top 54 of the frame 52 pivoted toward the trough 14. As the chute 40 and the top 44 of the conveyor 16 move toward a side of the trough 14, the mounting assembly 20 will pass through a position in which the frame 52 is essentially vertical as shown in FIG. 7. As the chute 40 and the top 44 of the conveyor 16 continue to move toward the side of the trough 14, the frame 52 is pivoted forward 66 with the top 54 of the frame 52 pivoted away from the trough 14 as shown in FIGS. 8 and 9.

Thus, the pivoting movement of the frame 52 provides a component of movement that is perpendicular to the lateral movement of the carriage 68 as it traverses the frame 52. The combination of the lateral movement of the carriage 68 across the frame 52 and the perpendicular movement provided by the pivoting motion of the frame 52 results in the ability of the coupling 122 to follow an arced path 172. The ability to follow the arced path 172 allows the conveyor 16 to pivot about the pivot point 170 holding the pivot point 170 stationary with respect to the trough 14 as the chute 40 travels along and above the trough 14.

An additional convenience provided by this system is a stand 176 for securing the conveyor 16 when the conveyor 16 is being stored while the drill 12 is moved along the rows for planting. The stand 176 includes a post 178 that extends upwardly from the drill 12 and terminates in a bracket 180. The post 178 is arranged so that the wall 32 near the seed-receiving end 36 of the conveyor 16 can be engaged by the bracket 180 to hold the conveyor 16 essentially parallel to the trough 14, as best shown in FIG. 2 (in phantom). The bracket 180 includes two C-shaped braces 182 with first ends 184 and second ends 186. The first ends 184 are coupled by a hinge 188. The second ends 186 terminate in tabs 190 that are formed to include apertures. To secure the conveyor 16 requires only that the second ends 186 are separated to open the bracket 180. The conveyor 16 is placed into the bracket 180 and the second ends 186 are moved together closing the bracket 180. A pin is received by the apertures to couple the second ends 186 to lock the bracket 180 and thereby secure the conveyor 16 for storage or travel.

Although the invention has been described in detail with reference to a preferred embodiment, variations and modifications exist within the scope and spirit of the invention as described and defined in the following claims.

We claim:

1. A mounting assembly for a device for transporting seed from a hopper, upwardly along a conveyor, to a transversely extending seed trough, the mounting assembly comprising a stand fixed relative to the seed trough, an elongated frame including a top, a bottom, and two sides, the bottom being pivotally mounted to the stand, a carriage movably coupled to the frame and arranged to traverse the length of the frame, and a coupling including a base and a union, the base being rotatably mounted to the carriage and the union being pivotally mounted to the conveyor.

2. The mounting assembly of claim 1, wherein the carriage includes a bar, a roller rotatably mounted to the bar, and a mount fixed to the bar and sized to accept the base, the base resting in the mount.

3. The mounting assembly of claim 2, wherein the carriage further includes a stabilizing roller arranged to prevent movement of the carriage perpendicular to the frame.

4. The mounting assembly of claim 1, wherein the coupling is a Y-shaped coupling having a cylindrical base and two prongs, and the base rests in a mount fixed to the carriage.

5. The mounting assembly of claim 4, wherein the prongs are spaced-apart and are each formed to include an aperture extending in a direction perpendicular to the base, the apertures in both prongs being arranged to extend along the same axis.

6. The mounting assembly of claim 1, wherein the bottom of the frame is mounted to the stand such that the frame pivots along an axis generally parallel to the seed trough.

7. A feed assembly for a seed drill of the type having an elongated transversely extending seed trough with a plurality of spaced-apart seed planting assemblies under the trough, the feed assembly comprising a hopper for receiving the seed to be planted, the hopper including a center defining a pivot point, means for conveying seed from the hopper to a position above the trough, the conveying means having an upper end disposed above the seed trough, a chute for dropping seed into the seed trough from the upper end, and a support assembly for movably supporting the conveying means during lateral movement of the chute along and above the trough such that the pivot point of the hopper remains stationary relative to the seed trough, the support assembly being coupled to the conveying means, the support assembly being movable relative to the trough to accommodate movement of the conveying means about the pivot point as the chute moves laterally above the trough.

8. The feed assembly of claim 7, wherein the support assembly includes universal means for coupling the conveying means to the support assembly such that the conveying means is provided with freedom of movement in any direction about the universal means relative to the support assembly.

9. The feed assembly of claim 8, wherein the universal means includes means for rotatably supporting the conveying means.

10. The feed assembly of claim 8, wherein the universal means includes means for pivotally supporting the conveying means.

11. The feed assembly of claim 8, wherein the support assembly further includes a carriage arranged to mount the universal means.

12. The feed assembly of claim 11, wherein the support assembly further includes a track arranged to movably mount the carriage, the track being carried by the seed drill.

13. The feed assembly of claim 7, wherein the support assembly includes a frame and a carriage movably mounted to the frame and arranged to translate the conveying means parallel to the seed trough.

14. The feed assembly of claim 13, wherein the support assembly includes means for mounting the frame for pivoted movement about an axis generally parallel to the seed trough.

15. The feed assembly of claim 14, wherein the means for mounting the frame for pivotal movement is fixed relative to the seed trough.

16. A mounting assembly for a conveyor for transporting seed from a hopper, upwardly to a point above a transversely extending seed trough, the mounting assembly comprising a stand fixed relative to the feed trough, a coupling pivotally mounted to the conveyor, and means for movably mounting the coupling so that the coupling can traverse a path parallel to the seed trough, the mounting means being attached to the stand.

17. The mounting assembly of claim 16, wherein the mounting means includes an elongated track attached to the stand and a carriage rotatably attached to the coupling, the carriage being movably mounted to the track and the track being positioned to provide the carriage movement along a path parallel to the seed trough.

18. The mounting assembly of claim 17, wherein the carriage includes a bar, a wheel rotatably mounted to the bar, the wheel being arranged to engage the track, and a mount formed to include a cylindrical cavity sized to accept the coupling.

19. The mounting assembly of claim 18, wherein the track includes an elongated frame having a top and a bottom, the bottom being pivotally attached to the stand and the frame being arranged so that the top and the bottom are parallel to the seed trough and the top is movable in a direction perpendicular to the seed trough.

20. The mounting assembly of claim 16, wherein the coupling is a Y-shaped coupling having a cylindrical base and two prongs, and the base rests in a cylindrical mount fixed to the mounting means.

21. The mounting assembly of claim 20, wherein the prongs are spaced-apart and are each formed to include an aperture perpendicular to the base, the apertures in both prongs being along the same axis.

22. A mounting assembly for a conveyor for transporting seed from a hopper upwardly above a transversely extending seed trough, the mounting assembly comprising a stand fixed relative to the seed trough, an elongated frame coupled to the stand, a carriage movably mounted to the frame, the carriage being arranged to traverse the length of the frame, the carriage being coupled to the conveyor, and the frame being pivotally movable on the stand in a direction perpendicular to the seed trough so that the movement of the carriage along the length of the frame and in a direction perpendicular to the seed trough combine to permit travel of the carriage along an arced path.

23. The mounting assembly of claim 22, wherein the carriage includes a bar, a wheel rotatably mounted to the bar, the wheel being arranged to engage the frame, and a post arranged to engage the frame, the post being arranged to stabilize the carriage relative to the frame in a direction perpendicular to the frame.

24. The mounting assembly of claim 22, wherein the carriage includes a bar, a wheel rotatably mounted to the bar, the wheel being arranged to engage the frame, and a mount formed to include a cavity sized to accept a coupling between the carriage and the shaft.

25. The mounting assembly of claim 24, wherein the frame further includes a top and a bottom, the bottom being pivotally attached to the stand and the frame being arranged so that the top and the bottom are parallel to the seed trough and the top is movable in a direction perpendicular toward and away from the seed trough.

26. The mounting assembly of claim 22, wherein the carriage is coupled to the shaft with a Y-shaped coupling having a cylindrical base and two prongs, and the base rests in a cylindrical mount fixed to the carriage.

27. The mounting assembly of claim 26, wherein the prongs are spaced-apart and are each formed to include an aperture perpendicular to the base, the apertures in both prongs being along the same axis.

28. A mounting assembly for a conveyor for transporting seed from a hopper to a transversely extending seed trough, the mounting assembly comprising a stand fixed relative to the seed trough, an elongated frame pivotally mounted to the stand, a carriage mounted to the frame, the carriage being arranged to traverse the length of the frame, and means for coupling the carriage to the conveyor such that the conveyor is provided with freedom of movement.

29. The mounting assembly of claim 28, wherein the coupling means includes a Y-shaped coupling having a cylindrical base and two prongs, and the base rests in a cylindrical mount fixed to the carriage.

30. The mounting assembly of claim 29, wherein the prongs are spaced-apart and are each formed to include an aperture perpendicular to the base, the apertures in both prongs being along the same axis.

31. The mounting assembly of claim 30, wherein the carriage includes a bar, a wheel rotatably mounted to the bar, the wheel being arranged to engage the frame, and a mount formed to include a cavity sized to accept the coupling means.

32. The mounting assembly of claim 31, wherein the frame further includes a top and a bottom, the bottom being attached to the pivoting means and the frame being arranged so that the top and the bottom are parallel to the seed trough and the top is movable in a direction perpendicular to the seed trough.

33. A mounting assembly for a conveyor transporting seed from a hopper to a transversely extending seed trough, the mounting assembly comprising a stand, a coupling coupled to the conveyor, and moving means coupled to the coupling and to the stand for moving the coupling along a transverse horizontal arced path relative to the seed trough, the moving means including a straight track and the coupling is mounted to the track for movement along the track.

34. The mounting assembly of claim 33, wherein the track is parallel to the seed trough.

35. A transporting assembly for transporting seed to a seed trough, the transporting assembly comprising
- a conveyor including a hopper end having a stationary pivot point,
- a stand,
- a coupling coupled to the conveyor, and
- moving means coupled to the coupling and to the stand for moving the coupling along a transverse horizontal arced path relative to the seed trough.

36. The transporting assembly of claim 35, wherein the moving means includes a straight track and the coupling is mounted to the track for movement along the track.

37. The transporting assembly of claim 36, wherein the track is parallel to the seed trough.

38. The transporting assembly of claim 35, wherein the stand is fixed relative to the seed trough.

* * * * *